(12) United States Patent
Ohara et al.

(10) Patent No.: US 12,292,615 B2
(45) Date of Patent: May 6, 2025

(54) LENS UNIT, IMAGING DEVICE, AND MOBILE OBJECT

(71) Applicant: KYOCERA Corporation, Kyoto (JP)

(72) Inventors: Naoto Ohara, Yokohama (JP);
Michiaki Hiraoka, Yokohama (JP);
Akihiko Hiraishi, Tokyo (JP); Hiroto Yahagi, Yokohama (JP); Keiichi Nagoshi, Yokohama (JP)

(73) Assignee: KYOCERA Corporation, Kyoto (JP)

( * ) Notice: Subject to any disclaimer, the term of this patent is extended or adjusted under 35 U.S.C. 154(b) by 507 days.

(21) Appl. No.: 17/754,637

(22) PCT Filed: Oct. 9, 2020

(86) PCT No.: PCT/JP2020/038285
§ 371 (c)(1),
(2) Date: Apr. 7, 2022

(87) PCT Pub. No.: WO2021/075372
PCT Pub. Date: Apr. 22, 2021

(65) Prior Publication Data
US 2022/0390704 A1 Dec. 8, 2022

(30) Foreign Application Priority Data

Oct. 16, 2019 (JP) ................................. 2019-189728

(51) Int. Cl.
*G02B 7/02* (2021.01)
*H04N 23/55* (2023.01)
(52) U.S. Cl.
CPC ............ *G02B 7/021* (2013.01); *H04N 23/55* (2023.01)

(58) Field of Classification Search
None
See application file for complete search history.

(56) References Cited

U.S. PATENT DOCUMENTS 7,072,125 B2 * 7/2006 Chuman ................ G02B 7/021
359/821
7,391,458 B2 6/2008 Sakamoto
(Continued)

FOREIGN PATENT DOCUMENTS

EP 4 040 206 A1 8/2022
JP S56-156009 U 11/1981
(Continued)

*Primary Examiner* — Robert E. Tallman
(74) *Attorney, Agent, or Firm* — Studebaker Brackett PLLC

(57) ABSTRACT

A lens unit includes a plurality of lenses arranged in an optical axis direction, a lens barrel, and a retainer. The lens barrel has an opening larger than outer diameters of the plurality of lenses and contains the plurality of lenses. The retainer holds the plurality of lenses by contacting, from a side adjacent to the opening in the lens barrel, one of the plurality of lenses that is closest to the opening. Each of the plurality of lenses has an object-side surface and an image-side surface which each include a flat portion that extends radially inward from an outer edge of the lens and that is perpendicular to the optical axis direction of the lens. Each of the plurality of lenses is held in planar contact with a holder at the flat portion. The retainer holds the plurality of lenses by biasing the plurality of lenses in the optical axis direction.

6 Claims, 6 Drawing Sheets

(56) References Cited

U.S. PATENT DOCUMENTS

| | | | |
|---|---|---|---|
| 10,338,338 B2 | 7/2019 | Kim | |
| 2005/0237418 A1 | 10/2005 | Sakamoto | |
| 2009/0290239 A1* | 11/2009 | Wu | G02B 13/0035 359/819 |
| 2010/0001071 A1* | 1/2010 | Ohara | G02B 27/0075 348/222.1 |
| 2018/0348466 A1 | 12/2018 | Hirth et al. | |
| 2020/0133095 A1* | 4/2020 | Cotoros | G02B 27/0006 |

FOREIGN PATENT DOCUMENTS

| | | | |
|---|---|---|---|
| JP | 2003-222776 A | 8/2003 |
| JP | 2014-123087 A | 7/2014 |
| JP | 2016-184082 A | 10/2016 |
| WO | 2004/003618 A1 | 1/2004 |

\* cited by examiner

LENS UNIT, IMAGING DEVICE, AND MOBILE OBJECT

REFERENCE TO RELATED APPLICATIONS

The present application claims priority from Japanese Patent Application No. 2019-189728 filed in the Japan Patent Office on Oct. 16, 2019, the entire contents of which are incorporated herein by reference.

TECHNICAL FIELD

The present disclosure relates to a lens unit, an imaging device, and a mobile object.

BACKGROUND OF THE INVENTION

PTL 1 discloses a lens barrel device (lens unit) including a lens barrel containing a plurality of lenses arranged in an optical axis direction.

CITATION LIST

Patent Literature

PTL 1: Japanese Unexamined Patent Application Publication No. 2003-222776

SUMMARY OF THE INVENTION

A lens unit according to the present disclosure includes a plurality of lenses arranged in an optical axis direction, a lens barrel, and a holding member. The lens barrel has an opening larger than outer diameters of the plurality of lenses and contains the plurality of lenses. The holding member holds the plurality of lenses by contacting, from a side adjacent to the opening in the lens barrel, one of the plurality of lenses that is closest to the opening. Each of the plurality of lenses has an object-side surface and an image-side surface which each include a flat portion that extends radially inward from an outer edge of the lens and that is perpendicular to the optical axis direction of the lens. Each of the plurality of lenses is held in planar contact with a holder at the flat portion. The holding member holds the plurality of lenses by biasing the plurality of lenses in the optical axis direction.

An imaging device according to the present disclosure includes a lens unit and an imaging element. The lens unit includes a plurality of lenses arranged in an optical axis direction, a lens barrel, and a holding member. The imaging element captures a subject image focused by the plurality of lenses. The lens barrel has an opening larger than outer diameters of the plurality of lenses and contains the plurality of lenses. The holding member holds the plurality of lenses by contacting, from a side adjacent to the opening in the lens barrel, one of the plurality of lenses that is closest to the object side. Each of the plurality of lenses has an object-side surface and an image-side surface which each include a flat portion that extends radially inward from an outer edge of the lens and that is perpendicular to the optical axis direction of the lens. Each of the plurality of lenses is held in planar contact with a holder at the flat portion. The holding member holds the plurality of lenses by applying pressure to the plurality of lenses in the optical axis direction.

A mobile object according to the present disclosure includes an imaging device. The imaging device includes a lens unit and an imaging element. The lens unit includes a plurality of lenses arranged in an optical axis direction, a lens barrel, and a holding member. The imaging element captures a subject image focused by the plurality of lenses. The lens barrel has an opening larger than outer diameters of the plurality of lenses and contains the plurality of lenses. The holding member holds the plurality of lenses by contacting, from a side adjacent to the opening in the lens barrel, one of the plurality of lenses that is closest to the object side. Each of the plurality of lenses has an object-side surface and an image-side surface which each include a flat portion that extends radially inward from an outer edge of the lens and that is perpendicular to the optical axis direction of the lens. Each of the plurality of lenses is held in planar contact with a holder at the flat portion. The holding member holds the plurality of lenses by pressing the plurality of lenses in the optical axis direction.

DETAILED DESCRIPTION

Figure 1:
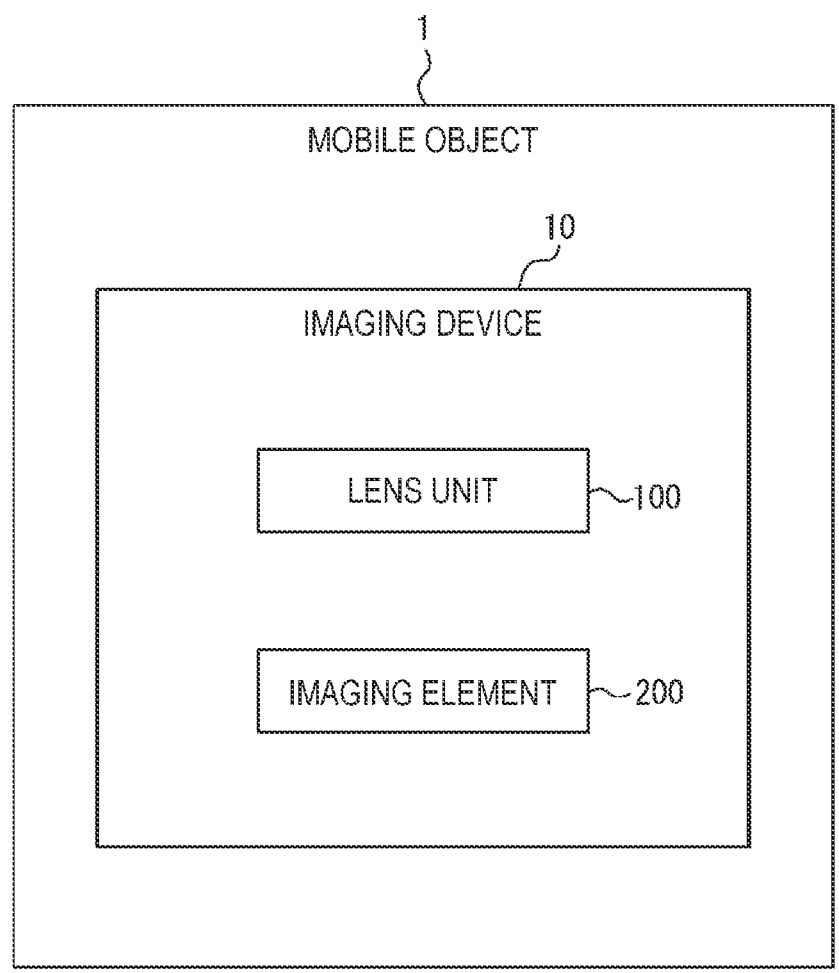
FIG. 1 illustrates an exemplary configuration of an imaging device including a lens unit according to an embodiment of the present disclosure.

In the above-described lens unit, the lenses contained in the lens barrel are required to be held in a stable manner. According to an aspect of the present disclosure, the stability of the lenses held in the lens barrel can be increased.

An embodiment of the present disclosure will now be described with reference to the drawings. In the drawings, the same reference signs denote the same or similar components. The drawings referred to in the following description are schematic. Dimensional ratios in the drawings, for example, do not necessarily coincide with actual dimensional ratios.

As illustrated in FIG. 1, an imaging device 10 including a lens unit 100 according to an embodiment of the present disclosure may be mounted in a mobile object 1. When the imaging device 10 is mounted in the mobile object 1, the imaging device 10 may capture an image of a subject in a space around the mobile object 1. The image captured by the imaging device 10 may be used, for example, to detect an object (human, vehicle, etc.) in the space around the mobile object 1.

Examples of the mobile object 1 may include a vehicle and an aircraft. Examples of the vehicle may include an automobile, an industrial vehicle, a railroad vehicle, a daily use vehicle, and a fixed-wing airplane that runs on a runway. Examples of the automobile may include a passenger vehicle, a truck, a bus, a two-wheel vehicle, and a trolley bus. Examples of the industrial vehicle may include an industrial vehicle for agriculture and an industrial vehicle for construction. Examples of the industrial vehicle may include a forklift and a golf cart. Examples of the industrial vehicle for agriculture may include a tractor, a cultivator, a transplanter, a binder, a combine, and a mower. Examples of the industrial vehicle for construction may include a bulldozer, a scraper, an excavator, a crane truck, a dump truck, and a road roller. The vehicle may be a vehicle driven by human force. The categories of the vehicle are not limited to those described above. For example, the automobile may be an industrial vehicle capable of running on a road. The same vehicle may belong to two or more categories. Examples of the aircraft may include a fixed-wing airplane and a rotary wing aircraft.

The imaging device 10 illustrated in FIG. 1 includes the lens unit 100 and an imaging element 200.

The lens unit 100 includes a plurality of optical members, such as lenses. The lenses included in the lens unit 100 may, for example, be lenses having a wide angle of view, such as fisheye lenses. The lens unit 100 focuses a subject image on a light-receiving surface of the imaging element 200.

The imaging element 200 includes, for example, a charge coupled device (CCD) image sensor or a complementary metal-oxide semiconductor (CMOS) image sensor. A plurality of pixels (light receiving elements) are arranged on the light-receiving surface of the imaging element 200. The imaging element 200 captures the subject image focused on the light-receiving surface and creates a captured image. The imaging device 10 may output the captured image to an external device mounted in the mobile object 1. The external device may be, for example, an electronic control unit (ECU), a display, or a navigation device. The imaging device 10 may have a function of performing a predetermined image process, such as a white balance adjustment process, an exposure adjustment process, or a gamma correction process, on the captured image.

In the example illustrated in FIG. 1, the imaging device 10 is a monocular camera including a single imaging system composed of the lens unit 100 and the imaging element 200. However, the imaging device 10 is not limited to this. The imaging device 10 may instead be a stereo camera that includes a plurality of imaging systems that cooperate with each other to capture images of a target from different visual points. When the imaging device 10 is a stereo camera, two lens units 100, for example, are disposed next to each other with an interval therebetween in a vehicle width direction of the mobile object 1 so that optical axes thereof are parallel to each other. Accordingly, the imaging systems capture images of substantially the same area from different visual points. The imaging device 10 may be fixed to, for example, a front bumper, a fender grille, a side fender, a light module, a hood, etc., of a vehicle.

The structure of the imaging device 10 will now be described with reference to FIG. 2.

Figure 2:
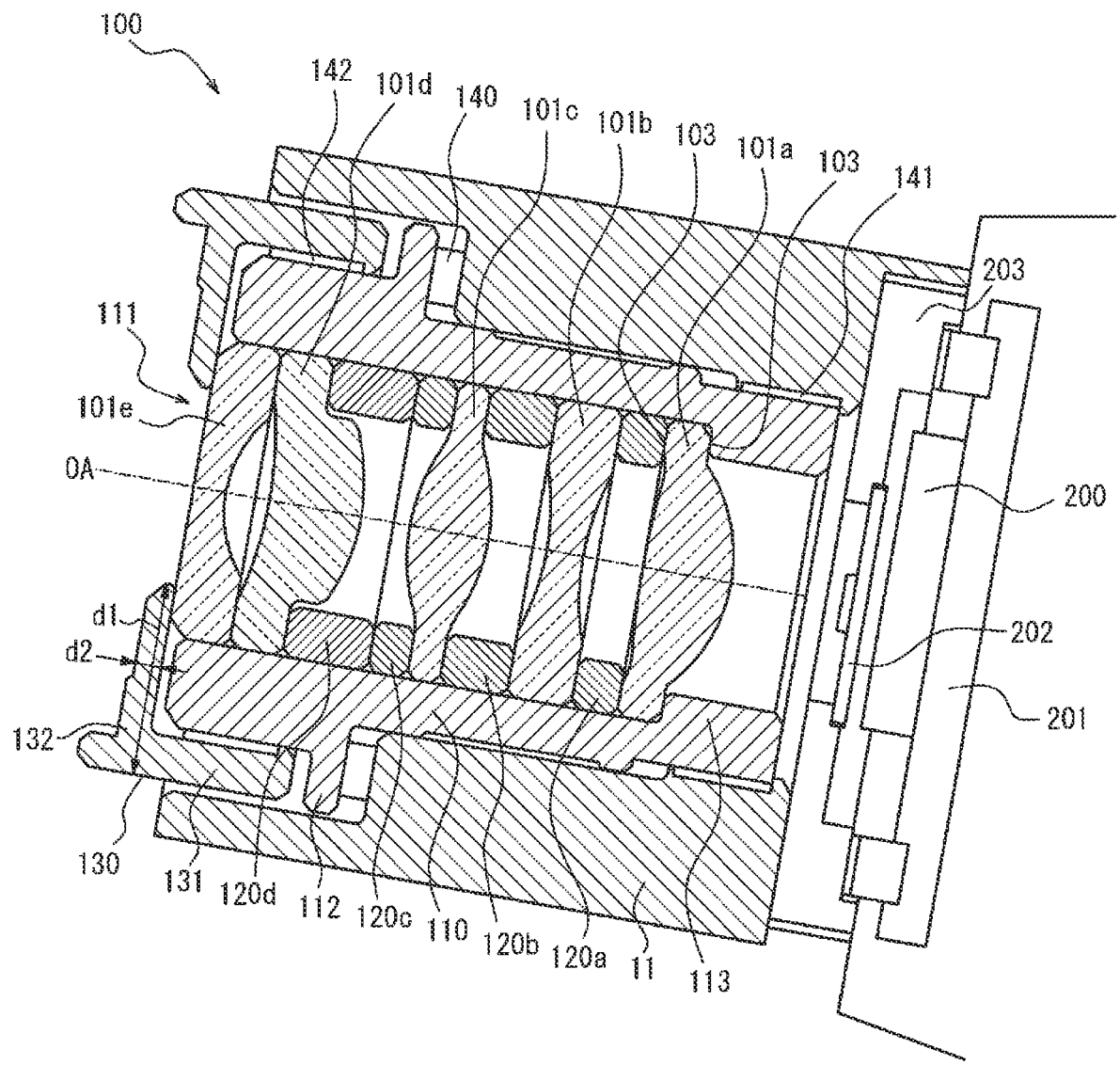
FIG. 2 is a sectional view illustrating an exemplary configuration of the imaging device illustrated in FIG. 1.

As illustrated in FIG. 2, the lens unit 100 includes a plurality of lenses 101a to 101e, a lens barrel 110, spacing rings 120a to 120d, and a retainer 130. In the following description, the lenses 101a to 101e will be referred to as lenses 101 when they are not distinguished from each other. Also, the spacing rings 120a to 120d will be referred to as spacing rings 120 when they are not distinguished from each other.

The lenses 101a to 101e are arranged in an optical axis direction OA. In other words, the lenses 101a to 101e are arranged such that optical axes thereof coincide with the optical axis direction OA. In the following direction, a direction orthogonal to the optical axis direction OA in a plan view viewed in the optical axis direction OA will be referred to as a radial direction, and a direction that circulates around the optical axis direction OA will be referred to as a circumferential direction.

The lenses 101 are made of a glass or a resin, such as polycarbonate (PC), cyclo-olefin polymer (COP), cyclo-olefin copolymer (COC), or poly(methyl methacrylate) (PMMA).

The lens barrel 110 is a cylindrical member having an opening 111 larger than the lenses 101a to 101e. The lens barrel 110 has an internal space in which the lenses 101 are contained. More specifically, the lens barrel 110 contains the lenses 101a to 101e such that the lens 101e, the lens 101d, the lens 101c, the lens 101b, and the lens 101a are arranged in that order from the opening 111. Thus, among the lenses 101, the lens 101e is closest to the opening 111. In addition, among the lenses 101, the lens 101a is at a side farthest from the opening 111 (hereinafter referred to as "bottom"). The lens barrel 110 contains the lenses 101 such that the direction of the central axis of the lens barrel 110 coincides with the optical axis direction OA. The lens barrel 110 may be made of, for example, aluminum or stainless steel.

The lens barrel 110 has a thread groove in the outer periphery thereof. A housing 11 has a threaded portion configured to engage with the thread groove in the outer periphery of the lens barrel 110. The imaging device 10 includes an adhesive member positioned between the thread groove in the outer periphery of the lens barrel 110 and the threaded portion of the housing 11. More specifically, the lens barrel 110 is accommodated in the housing 11 of the imaging device 10 and fixed to the housing 11 at a first fixing section 141. The lens barrel 110 is, for example, fixed by being screwed into the housing 11. In this case, a thread crest is formed on an inner peripheral surface of an accommodation space of the housing 11 that accommodates the lens barrel 110 at a position corresponding to the first fixing section 141. In addition, a thread groove that engages with the thread crest formed in the accommodation space of the housing 11 is formed in an outer peripheral surface of the lens barrel 110 at a position corresponding to the first fixing section 141. The adhesive member is applied to at least one of the thread crest on the inner peripheral surface of the accommodation space of the housing 11 and the thread groove in the outer peripheral surface of the lens barrel 110.

By inserting the lens barrel 110 into the accommodation space of the housing 11 while rotating the lens barrel 110 in the circumferential direction, the lens barrel 110 can be screwed into the accommodation space of the housing 11 such that the thread crest on the inner peripheral surface of the accommodation space of the housing 11 engages with the thread groove in the outer peripheral surface of the lens barrel 110. The lens barrel 110 and the housing 11 of the imaging device 10 are fixed by adhesion while the position of the lens barrel 110 is adjusted such that the lenses 101 focus the subject image on the light-receiving surface of the imaging element 200 positioned on an imaging substrate 201. When the adhesive member is a thermosetting adhesive, the thermosetting adhesive is cured to fix the lens barrel 110 and the housing 11. As illustrated in FIG. 2, the first fixing section 141 may, for example, be positioned near the bottom end of the lens barrel 110.

A filter 202 is positioned between the lens unit 100 and the imaging element 200. The filter 202 may be, for example, an ultraviolet (UV)/infrared (IR) cut filter, a color filter, or a low-pass filter. The filter 202 may instead be a glass plate having an antireflection (AR) coating. The filter 202 is supported by a support portion 203. The support portion 203 supports the filter 202. The support portion 203 has a sealing structure so that no foreign matter adheres to the light-receiving surface of the imaging element 200.

A first projecting portion 112 that projects radially outward is formed on the outer peripheral surface of the lens barrel 110. The first projecting portion 112 is in contact with the housing 11 with a wave washer 140 provided therebetween when the lens unit 100 is accommodated in the housing 11. When the lens barrel 110 is inserted into the accommodation space of the housing 11, the wave washer 140 is pressed and urged by the first projecting portion 112 of the lens barrel 110 in the direction in which the lens barrel 110 is inserted. When the lens barrel 110 is rotated for position adjustment, it may be difficult to perform fine adjustment due to backlash. The backlash can be reduced by placing the wave washer 140 that is pressed and urged between the first projecting portion 112 of the lens barrel 110 and the housing 11.

A second projecting portion 113 that projects radially inward is provided on an inner peripheral surface of the lens barrel 110 at the bottom of the lens barrel 110. The second projecting portion 113 of the lens barrel 110 has an inner diameter less than the outer diameter of the lens 101a closest to the bottom. Accordingly, the second projecting portion 113 serves as a holder that holds the lens 101a.

The spacing rings 120 are annular members having an outer diameter substantially equal to the inner diameter of the lens barrel 110 and an inner diameter substantially equal to the outer diameter of a lens portion of each lens 101 described below. The spacing rings 120 serve as holders that hold the lenses 101 in the lens barrel 110. The spacing rings 120 also serve as spacers positioned between the lenses 101 that are adjacent to each other in the optical axis direction OA to adjust the distances between the adjacent lenses 101 in the optical axis direction OA.

The spacing ring 120a is positioned between an object-side surface (surface adjacent to the opening 111) of the lens 101a and an image-side surface (surface adjacent to the bottom) of the lens 101b. The spacing ring 120b is positioned between an object-side surface of the lens 101b and an image-side surface of the lens 101c. The spacing ring 120c is positioned on an object-side surface of the lens 101c. The spacing ring 120d is positioned between the spacing ring 120c and an image-side surface of the lens 101d. The lens 101e is positioned in contact with an object-side surface of the lens 101d. The intervals between the lenses 101 contained in the lens barrel 110 in the optical axis direction OA are adjusted by the spacing rings 120a to 120d.

As described above, the lens barrel 110 has the opening 111 larger than the outer diameters of the lenses 101. In addition, the second projecting portion 113, which projects radially inward and which is capable of holding the lens 101a closest to the bottom, is provided on the inner peripheral surface of the lens barrel 110 at the bottom of the lens barrel 110. Accordingly, the lens 101a, the spacing ring 120a, the lens 101b, the spacing ring 120b, the lens 101c, the spacing ring 120c, the spacing ring 120d, the lens 101d, and the lens 101e are inserted into the lens barrel 110 through the opening 111 in that order.

The retainer 130, which serves as a holding member, is in contact with the lens 101e, which is one of the lenses 101 that is closest to the opening 111, and thereby holds the lenses 101 from the side adjacent to the opening 111. The retainer 130 includes an outer peripheral portion 131 and a contact portion 132.

The outer peripheral portion 131 is fixed to the outer peripheral surface of the lens barrel 110. For example, as illustrated in FIG. 2, the outer peripheral portion 131 is fixed to the outer peripheral surface of the lens barrel 110 at a second fixing section 142, which is closer to the opening 111 than the first projecting portion 112. The outer peripheral portion 131 is, for example, fixed by being screwed onto the lens barrel 110. In this case, for example, a thread crest is formed on the outer peripheral surface of the lens barrel 110 at a position corresponding to the second fixing section 142. In addition, a thread groove that engages with the thread crest formed on the outer peripheral surface of the lens barrel 110 is formed in an inner peripheral surface of the outer peripheral portion 131 at a position corresponding to the second fixing section 142. The retainer 130 is fixed to the outer peripheral surface of the lens barrel 110 by pushing the retainer 130 into the housing 11 in the optical axis direction OA while rotating the retainer 130 in the circumferential direction.

The contact portion 132 extends radially inward from an end portion of the outer peripheral portion 131 adjacent to the opening 111. When the retainer 130 is fixed to the outer peripheral surface of the lens barrel 110, the contact portion 132 is in contact with the lens 101e closest to the opening 111 and holds the lenses 101 in the optical axis direction OA.

The structure of the lenses 101 included in the lens unit 100 according to the present embodiment and the manner in which the lenses 101 are held by the retainer 130 will now be described in more detail. First, a problem of a general lens unit including a lens barrel in which a plurality of lenses are held will be described.

As described above, the lens barrel is made of, for example, aluminum. The lenses are made of, for example, glass. In this case, when the temperature is high, expansion of the lens barrel made of aluminum is greater than expansion of the lenses made of glass. Therefore, when the temperature increases, the lens barrel radially expands, and axial force that holds the lenses in the optical axis direction OA is reduced. As a result, there is a possibility that displacements of the lenses, for example, will occur. When the temperature is low, contraction of the lens barrel made of aluminum is greater than that of the lenses made of glass. Therefore, a large stress is applied to the lenses, and there is a possibility that breakage of the lenses and deformation of components, for example, will occur.

Figure 3A:
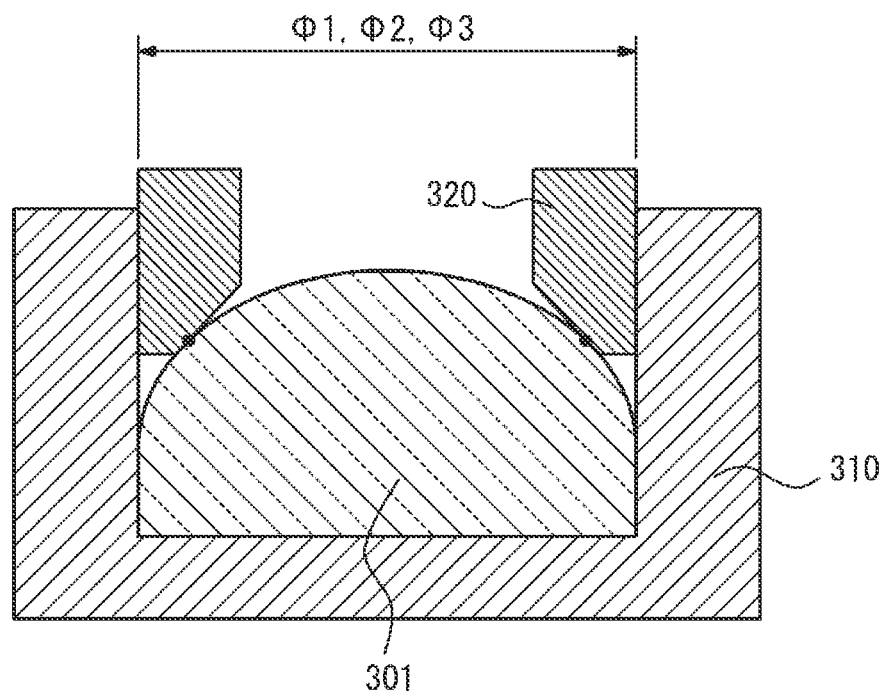
FIG. 3A illustrates a problem in holding a lens in a general lens unit.

In a general lens unit, as illustrated in FIG. 3A, a lens 301 has a surface that is curved (convex in FIG. 3A) over the entire area thereof. When the lens 301 has a surface that is curved over the entire area thereof, it is difficult to hold the lens 301 in a stable manner. The reason for this will be described with reference to FIGS. 3A to 3D. Referring to FIGS. 3A to 3D, assume that the lens 301 has an outer diameter $\phi 1$, a lens barrel 310 that contains the lens 301 has an inner diameter $\phi 2$, and a spacing ring 320 that holds the lens 301 in the lens barrel 310 has an outer diameter $\phi 3$.

Referring to FIG. 3A, assume that the outer diameter $\phi 1$ of the lens 301, the inner diameter $\phi 2$ of the lens barrel 310, and the outer diameter $\phi 3$ of the spacing ring 320 are substantially equal to each other. In this case, since one surface of the lens 301 is curved over the entire area thereof, the lens 301 and the spacing ring 320 are not in line contact with each other but are in point contact with each other in a certain cross section. Therefore, it is difficult to hold the lens 301 in a stable manner.

Figure 3B:
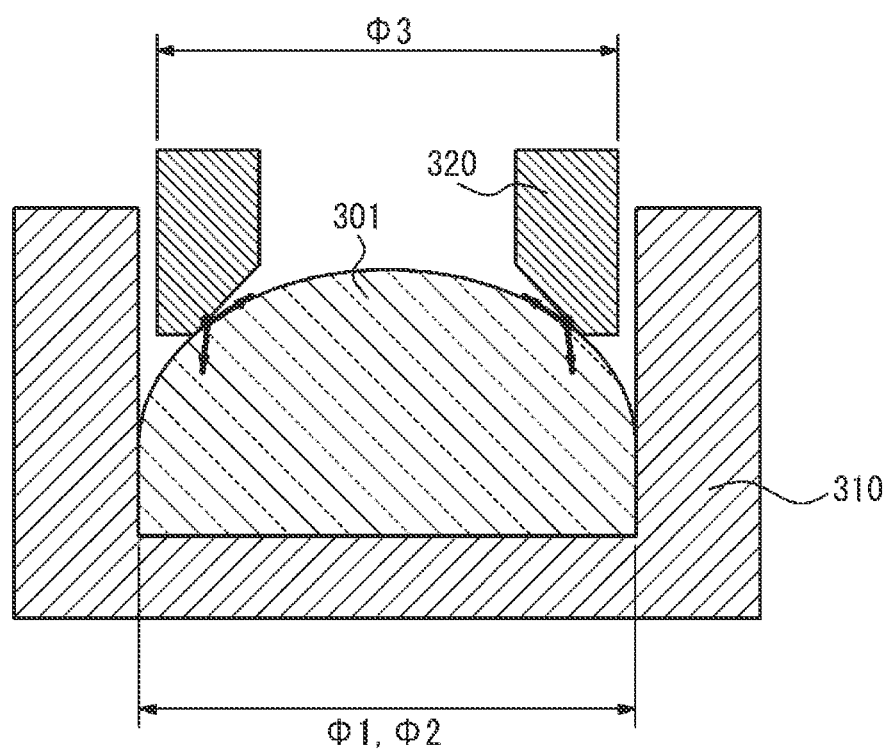
FIG. 3B illustrates a problem in holding a lens in a general lens unit.

Referring to FIG. 3B, assume that the outer diameter $\phi 3$ of the spacing ring 320 is less than the outer diameter $\phi 1$ of the lens 301 and the inner diameter $\phi 2$ of the lens barrel 310 ($\phi 3 < \phi 1 \approx \phi 2$). In this case, contact points between the lens 301 and the spacing ring 320 move in a range corresponding to the difference between the inner diameter ϕ2 of the lens barrel 310 and the outer diameter ϕ3 of the spacing ring 320 in the radial direction. Therefore, it is difficult to hold the lens 301 in a stable manner.

Figure 3C:
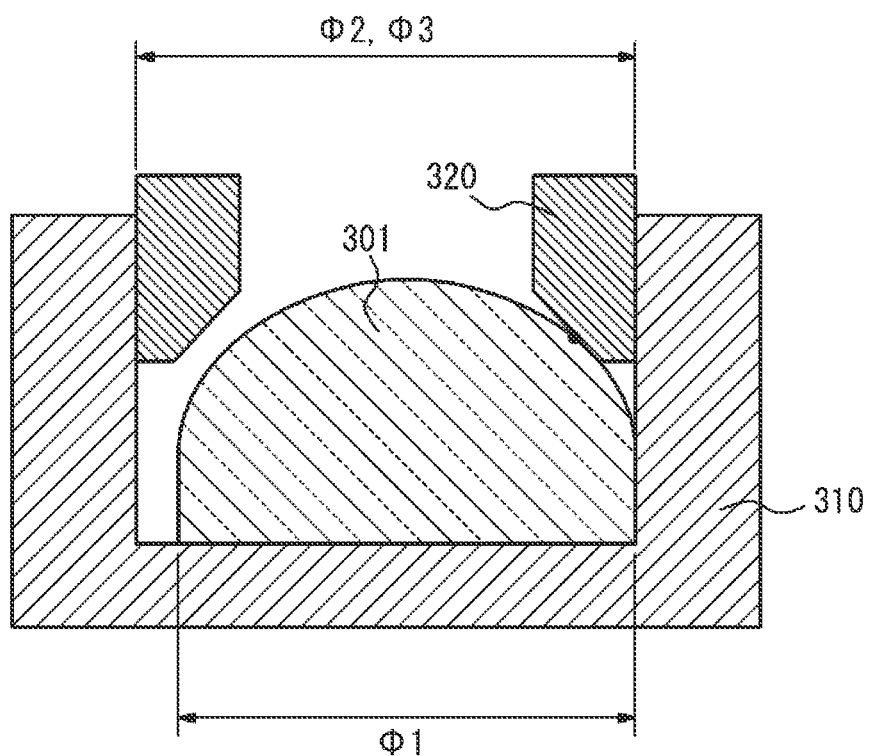
FIG. 3C illustrates a problem in holding a lens in a general lens unit.

Referring to FIG. 3C, assume that the outer diameter ϕ1 of the lens 301 is less than the inner diameter ϕ2 of the lens barrel 310 and the outer diameter ϕ3 of the spacing ring 320 (ϕ1<ϕ2≈ϕ3). In this case, the lens 301 and the spacing ring 320 are in contact with each other at only one point in a certain cross section. Therefore, it is difficult to hold the lens 301 in a stable manner.

Figure 3D:
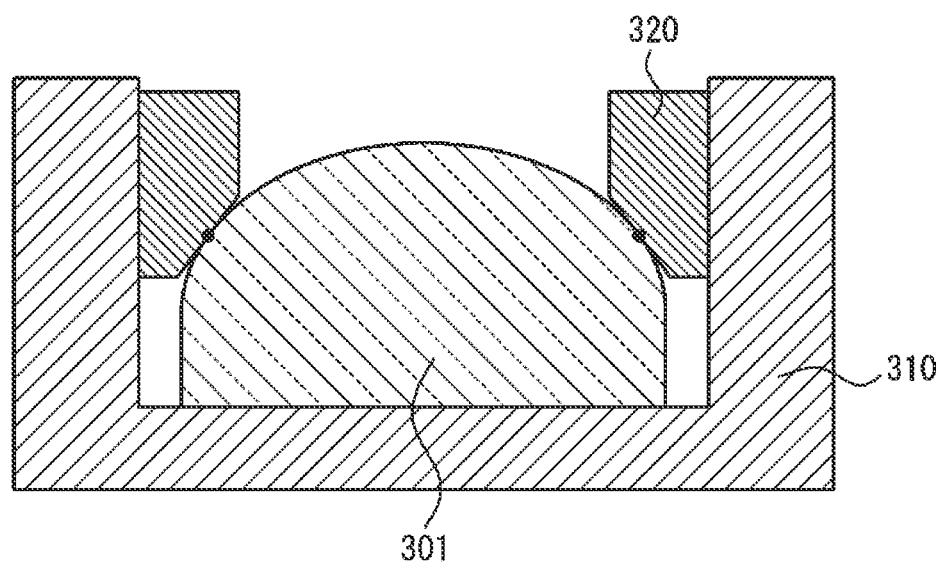
FIG. 3D illustrates a problem in holding a lens in a general lens unit.

Referring to FIG. 3D, assume that the lens barrel 310 has radially expanded due to high temperature. In this case, the contact points between the lens 301 and the spacing ring 320 are shifted from those in, for example, FIG. 3A. Therefore, the optical axis of the lens 301 is also shifted.

In addition, the curved surface of the lens 301 is generally mirror finished. Therefore, the frictional force between the lens 301 and the spacing ring 320 is small, which makes it difficult to hold the lens 301 in a stable manner.

As described above, it is difficult to hold the lens 301 in a stable manner in the lens unit according to the related art. According to the present disclosure, the stability of the lenses 101 contained in the lens barrel 110 is increased by the structure of the lenses 101 and the retainer 130 described in detail below. The structure of the retainer 130 will now be described.

As described above, the retainer 130 includes the outer peripheral portion 131 that is fixed to the outer peripheral surface of the lens barrel 110 and the contact portion 132 that extends radially inward from the end portion of the outer peripheral portion 131 adjacent to the opening 111 and that is in contact with the lens 101e. As illustrated in FIG. 2, a width d2 of the contact portion 132 in the optical axis direction OA is less than a width d1 of the contact portion 132 in the radial direction. In other words, the contact portion 132 is thin in the optical axis direction OA. According to this structure, the contact portion 132 has spring characteristics in the optical axis direction OA. As a result, when the contact portion 132 is in contact with the lens 101e closest to the opening 111, the retainer 130 is capable of holding the lenses 101 while urging the lenses 101 in the optical axis direction OA.

When the retainer 130 holds the lenses 101 while urging the lenses 101 in the optical axis direction OA, the stress applied to the lenses 101 due to contraction of the lens barrel 110 can be absorbed when the temperature is low. As a result, breakage of the lenses 101 and deformation of components, for example, can be prevented when the temperature is low, and the lenses 101 contained in the lens barrel 110 can be held in a stable manner.

In addition, when the retainer 130 holds the lenses 101 while urging the lenses 101 in the optical axis direction OA, reduction in the axial force applied to the lenses 101 due to expansion of the lens barrel 110 can be compensated for when the temperature is high. As a result, displacements of the lenses 101, for example, can be prevented when the temperature is high, and the lenses 101 contained in the lens barrel 110 can be held in a stable manner.

The spring constant of the retainer 130 (contact portion 132) in the optical axis direction OA is determined based on various parameters, such as the coefficients of linear expansion of the members that constitute the lenses 101, the sizes of the lenses 101, the coefficient of linear expansion of the member that constitutes the lens barrel 110, the size of the lens barrel 110, and the strength of the member that constitutes the retainer 130. The retainer 130 may be designed to have a spring constant such that the stress applied to the lenses 101 due to contraction of the lens barrel 110 can be absorbed when the temperature is low and such that reduction in the axial force due to expansion of the lens barrel 110 can be compensated for when the temperature is high.

Figure 4:
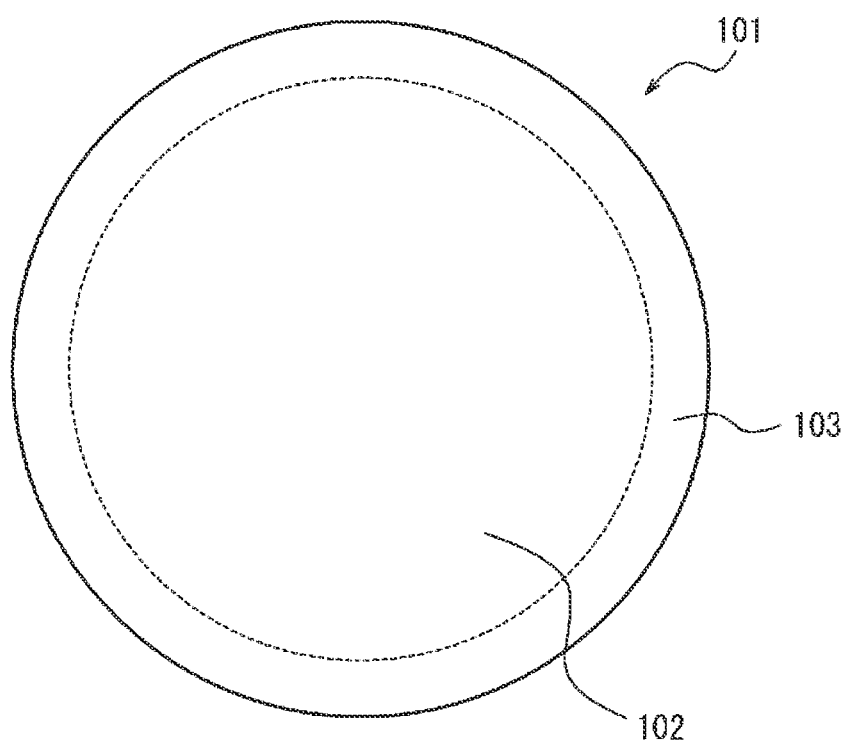
FIG. 4 is a plan view illustrating an exemplary configuration of a lens illustrated in FIG. 2.

The structure of each lens 101 will now be described with reference to FIGS. 2 and 4. FIG. 4 illustrates a surface of the lens 101 viewed in the optical axis direction OA.

In the present embodiment, each lens 101 includes a lens portion 102 and a flat portion 103.

As illustrated in FIG. 4, the lens portion 102 is positioned at the center of the lens 101. The lens portion 102 has a convex surface or a concave surface. The convex surface or the concave surface of the lens portion 102 refracts light so that the light diverges or converges.

The flat portion 103 extends radially from the outer edge of the lens 101, and is positioned around the lens portion 102 so as to surround the lens portion 102. In other words, the flat portion 103 has an annular shape. As illustrated in FIG. 2, the flat portion 103 is a flat surface that is perpendicular to the optical axis direction OA of the lens 101. The lens 101 has an object-side surface and an image-side surface which each include the lens portion 102 and the flat portion 103. The lens 101 is held in planar contact with a holder at the flat portion 103.

For example, the second projecting portion 113, which serves as a holder, has a flat surface perpendicular to the optical axis direction OA. The lens 101a is held such that the flat surface of the second projecting portion 113 that is perpendicular to the optical axis direction OA is in planar contact with the flat portion 103 of the image-side surface of the lens 101a. The spacing ring 120a, which also serves as a holder, has flat surfaces perpendicular to the optical axis direction OA on both the side facing the lens 101a and the side facing the lens 101b. The lens 101a is held such that the flat surface on one side of the spacing ring 120a that is perpendicular to the optical axis direction OA is in planar contact with the flat portion 103 of the object-side surface of 101a. Similarly to the lens 101a, each of the other lenses 101b to 101e is also held such that the flat portion 103 of each of the object-side surface and the image-side surface is in planar contact with a flat surface of a holder that is perpendicular to the optical axis direction OA. The lens 101e closest to the opening 111 is held such that the flat portion 103 of the object-side surface thereof is in contact with the contact portion 132 of the retainer 130, which also serves as a holder.

Each of the holders that hold the lenses 101 is formed such that the flat surface thereof that is perpendicular to the optical axis direction OA does not come into contact with the lens portion 102 of the corresponding lens 101. Thus, the lenses 101 can be held without blocking light that travels through the lens portion 102.

Since each lens 101 is held in planar contact with a holder (retainer 130, second projecting portion 113, spacing ring 120, or another lens 101), the contact area between the lens 101 and the holder can be increased. In addition, the reliability of transmission of the axial force can be increased. In addition, since each lens 101 is in planar contact with the holder, even when the lens barrel 110 expands due to high temperature, the contact points between the holder and the lens 101 are not shifted in the optical axis direction OA. As a result, the stability of the lenses 101 that are held is increased.

In the present embodiment, the lenses 101 have the same outer diameter. Since the lenses 101 have the same outer diameter, the lens barrel 110 may have a constant inner diameter. Since the lens barrel 110 has a constant inner diameter, the spacing rings 120 may have the same size. Thus, the shapes of components of the lens unit 100 can be simplified.

Since the lens barrel 110 has a constant inner diameter, the axial force that holds the lenses 101 in the optical axis direction OA is linearly transmitted to each of the lens 101 in the optical axis direction OA. Therefore, loss in the axial force can be reduced, and the stability of the lenses 101 that are held can be increased.

In addition, since a portion (seat) of each lens 101 that is held by a holder has the flat portion 103, which is a flat surface perpendicular to the optical axis direction OA, on each side of the lens 101, the thickness of the seat can be increased. When the thickness of the seat is increased, deformation of the seat can be reduced, so that and the stability of the lenses 101 that are held can be increased.

As described above, each of the lenses 101a to 101e is held in planar contact with a holder, which is the retainer 130, the second projecting portion 113, another lens 101, or a spacing ring 120, at the flat portion 103.

Assume that the outer diameter and the inner diameter of a region in which the lens 101a and the second projecting portion 113 are in planar contact with each other are $\phi_{o1}$ and respectively. Assume that the outer diameter and the inner diameter of a region in which the lens 101a and the spacing ring 120a are in planar contact with each other are $\phi_{o2}$ and $\phi_{i2}$, respectively. Assume that the outer diameter and the inner diameter of a region in which the lens 101b and the spacing ring 120a are in planar contact with each other are $\phi_{o3}$ and $\phi_{i3}$, respectively. Similarly, assume that the outer diameter and the inner diameter of a region in which the lens 101 closest to the object side (lens 101e in the example of FIG. 2) and the retainer 130 are in planar contact with each other are $\phi_{oN}$ and $\phi_{iN}$, respectively. In this case, the following expression may be satisfied.

$$\phi_{o1} - \phi_{i1} \cap \phi_{o2} \ldots \cap \phi_{oN} - \phi_{iN}$$

In the above expression, when the outer diameter and the inner diameter of the region in which each lens 101 is in planar contact with a holder are $\phi_{on}$ and $\phi_{in}$, respectively, $\phi_{on} - \phi_{in}$ corresponds to a portion obtained by removing a portion corresponding to the inner diameter $\phi_{in}$ from a portion corresponding to the outer diameter $\phi_{on}$ in the sectional view illustrated in FIG. 2.

Figure 5:
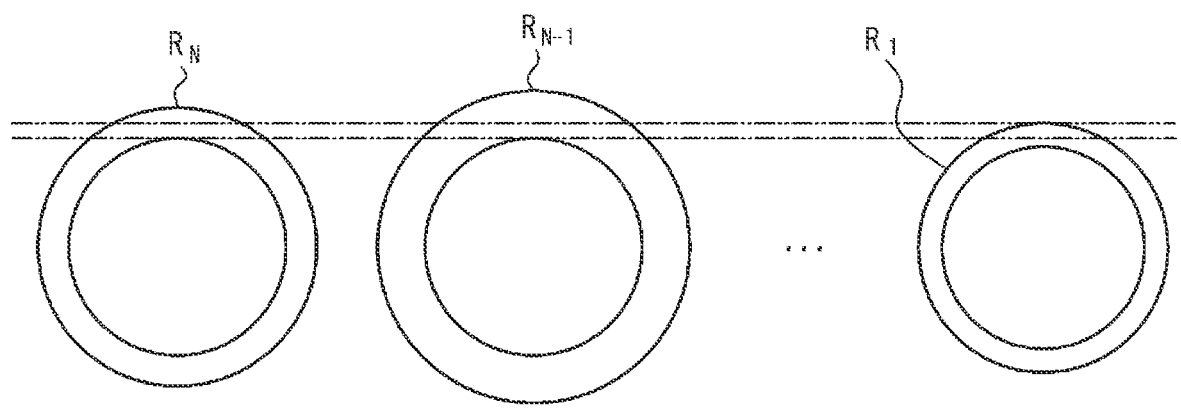
FIG. 5 illustrates an example of regions in which each of a plurality of lenses illustrated in FIG. 2 is in planar contact with a holder.

The above expression means that the regions in which the lenses 101 are in planar contact with the respective holders may at least partially overlap when viewed in the optical axis direction OA. More specifically, referring to FIG. 5, assume that a region in which the lens 101a and the second projecting portion 113 are in planar contact with each other is $R_1$. Similarly, assume that a region in which the lens 101e closest to the object side and the lens 101d are in planar contact with each other is $R_{N-1}$, and a region in which the lens 101e and the retainer 130 are in planar contact with each other is $R_N$. In this case, there may be an area in which the region $R_1, \ldots$, the region $R_{N-1}$, and the region $R_N$ all overlap when viewed in the optical axis direction OA.

According to the above-described structure, even when the lenses 101 have different outer diameters, the axial force that holds the lenses 101 in the optical axis direction OA may be linearly transmitted to each lens 101 in the optical axis direction OA. Accordingly, the stress applied to the components can be reduced.

As described above, according to the present embodiment, the lens unit 100 includes the plurality of lenses 101 arranged in the optical axis direction OA, the lens barrel 110, and the retainer 130 that serves as a holding member. The lens barrel 110 has the opening 111 larger than the outer diameters of the lenses 101 and contains the lenses 101. The retainer 130 holds the plurality of lenses 101 by contacting, from a side adjacent to the opening 111 in the lens barrel 110, the lens 101e, which is one of the plurality of lenses 101 that is closest to the opening 111. Each lens 101 has an object-side surface and an image-side surface which each include the flat portion 103 that extends radially inward from the outer edge of the lens 101 and that is perpendicular to the optical axis direction OA of the lens 101. Each lens 101 is held in planar contact with a holder at the flat portion 103. The retainer 130 holds the plurality of lenses 101 by biasing the plurality of lenses 101 in the optical axis direction OA.

Since the retainer 130 holds the lenses 101 by applying pressure to the lenses 101 in the optical axis direction OA, the stress applied to the lenses 101 due to contraction of the lens barrel 110 can be absorbed when the temperature is low. In addition, reduction in the axial force applied to the lenses 101 due to expansion of the lens barrel 110 can be compensated for when the temperature is high. In addition, since each lens 101 is held while the flat portion 103 of the lens 101 is in planar contact with the holder, the contact area can be increased and the axial force can be reliably transmitted. In addition, displacements of the optical axis due to expansion of the lens barrel 110, for example, do not easily occur. Accordingly, the stability of the lenses 101 contained in the lens barrel 110 can be increased.

Although an embodiment of the present disclosure has been described with reference to the drawings and by way of examples, it is to be noted that various alterations and modifications are possible based on the present disclosure by those skilled in the art. Therefore, these alterations and modifications are to be regarded as being within the scope of the present disclosure.

REFERENCE SIGNS LIST 1 mobile object
10 imaging device
11 housing
100 lens unit
101, 101a, 101b, 101c, 101d, 101e lens
102 lens portion
103 flat portion
110 lens barrel
111 opening
112 first projecting portion
113 second projecting portion (holder)
120, 120a, 120b, 120c, 120d spacing ring (holder)
130 retainer (holding member)
131 outer peripheral portion
132 holding portion
140 wave washer
141 first fixing section
142 second fixing section
200 imaging element
201 imaging substrate
202 filter
203 support portion

The invention claimed is:
1. A lens unit comprising:
a plurality of lenses arranged in an optical axis direction;
a lens barrel having an opening larger than outer diameters of the plurality of lenses and containing the plurality of lenses; and a holding member that holds the plurality of lenses by contacting, from a side adjacent to the opening in the lens barrel, one of the plurality of lenses that is closest to the opening, wherein each of the plurality of lenses has an object-side surface and an image-side surface which each include a flat portion that extends radially inward from an outer edge of the lens and that is perpendicular to the optical axis direction of the lens, wherein each of the plurality of lenses is held in planar contact with a holder at the flat portion, wherein the holding member holds the plurality of lenses by biasing the plurality of lenses in the optical axis direction, wherein a first projecting portion that projects radially outward is formed on the outer peripheral surface of the lens barrel, and wherein the first projecting portion is in contact with a housing with a wave washer provided therebetween when the lens unit is accommodated in the housing.

2. The lens unit according to claim 1, wherein the outer diameters of the plurality of lenses are equal to each other.

3. The lens unit according to claim 1, wherein the holder with which each of the plurality of lenses is held comprises the holding member, a projecting portion that projects radially inward from an inner peripheral surface of the lens barrel, another one of the plurality of lenses that is in contact with the lens, or a spacing ring positioned between one of the plurality of lenses and another one of the plurality of lenses that is adjacent to the one of the plurality of lenses, and wherein regions in which the plurality of lenses are each in planar contact with the holder at least partially overlap when viewed in the optical axis direction.

4. The lens unit according to claim 1, wherein the holding member includes an outer peripheral portion fixed to an outer peripheral surface of the lens barrel and a contact portion that extends radially inward from an end portion of the outer peripheral portion that is adjacent to the opening, the contact portion being in contact with the one of the plurality of lenses that is closest to the opening, and wherein a width of the contact portion in the optical axis direction is less than a width of the contact portion in a radial direction.

5. An imaging device comprising:

a lens unit including a plurality of lenses arranged in an optical axis direction, a lens barrel having an opening larger than outer diameters of the plurality of lenses and containing the plurality of lenses, and a holding member that holds the plurality of lenses by contacting, from a side adjacent to the opening in the lens barrel, one of the plurality of lenses that is closest to an object side; and an imaging element that captures a subject image focused by the plurality of lenses, wherein each of the plurality of lenses has an object-side surface and an image-side surface which each include a flat portion that extends radially inward from an outer edge of the lens and that is perpendicular to the optical axis direction of the lens, wherein each of the plurality of lenses is held in planar contact with a holder at the flat portion, wherein the holding member holds the plurality of lenses by applying pressure to the plurality of lenses in the optical axis direction, wherein a first projecting portion that projects radially outward is formed on the outer peripheral surface of the lens barrel, and wherein the first projecting portion is in contact with a housing with a wave washer provided therebetween when the lens unit is accommodated in the housing.

6. A mobile object comprising:

a lens unit including a plurality of lenses arranged in an optical axis direction, a lens barrel having an opening larger than outer diameters of the plurality of lenses and containing the plurality of lenses, and a holding member that holds the plurality of lenses by contacting, from a side adjacent to the opening in the lens barrel, one of the plurality of lenses that is closest to an object side; and an imaging device including an imaging element that captures a subject image focused by the plurality of lenses, wherein each of the plurality of lenses has an object-side surface and an image-side surface which each include a flat portion that extends radially inward from an outer edge of the lens and that is perpendicular to the optical axis direction of the lens, wherein each of the plurality of lenses is held in planar contact with a holder at the flat portion, wherein the holding member holds the plurality of lenses by pressing the plurality of lenses in the optical axis direction, wherein a first projecting portion that projects radially outward is formed on the outer peripheral surface of the lens barrel, and wherein the first projecting portion is in contact with a housing with a wave washer provided therebetween when the lens unit is accommodated in the housing.

* * * * *